United States Patent [19]

Otaki

[11] 4,040,327

[45] Aug. 9, 1977

[54] HIGH FATIGUE SCREW THREADS

[75] Inventor: Hideyuki Otaki, Mitaka, Japan

[73] Assignee: Agency of Industrial Science and Technology, Tokyo, Japan

[21] Appl. No.: 614,772

[22] Filed: Sept. 19, 1975

[30] Foreign Application Priority Data

Sept. 20, 1974 Japan .............................. 49-108572

[51] Int. Cl.$^2$ ........................................... F16B 33/02
[52] U.S. Cl. ..................................................... 85/46
[58] Field of Search ...................... 85/46, 1 T; 151/22

[56] References Cited

U.S. PATENT DOCUMENTS

| 658,086 | 9/1900 | Higbee ................................. 151/22 |
| 2,742,074 | 4/1956 | Rosan ................................. 85/46 X |
| 3,175,850 | 3/1965 | Steczynski ........................... 85/46 X |
| 3,433,117 | 3/1969 | Gowen et al. ........................ 85/46 X |

FOREIGN PATENT DOCUMENTS

| 474,290 | 8/1969 | SwedenITZ ............................ 85/46 |

OTHER PUBLICATIONS

World Screw-Thread Forms I–VIII from American Machinist/Metal Working Manufacturing, 6/12/61, p. 129, 6/26/61 pp. 93, 95, 7/10/61, p. 111, 7/24/61, pp. 105, 107, 8/21/61, pp. 119, 121.

*Primary Examiner*—Roy D. Frazier
*Assistant Examiner*—Thomas J. Holko
*Attorney, Agent, or Firm*—Haight & Huard

[57] ABSTRACT

A symmetric screw thread system including external threads each profiled to have a flank angle of $(70 \pm 2)°$ and a flat root located at $(0.27 \pm 0.02)H$ from an intersecting point of two lines extended from opposing flanks of two adjacent threads and connected to said opposing flanks through arcs of a radius $(0.15 \pm 0.02)p$ where H is the depth and $p$ is the pitch of the threads. Alternatively, the system may include external threads configured to have a flank angle of $(106 \pm 5)°$ and connected by a root having a radius of $(0.30 \pm 0.01)p$.

1 Claim, 11 Drawing Figures

FIG. 3a
FIG. 3b
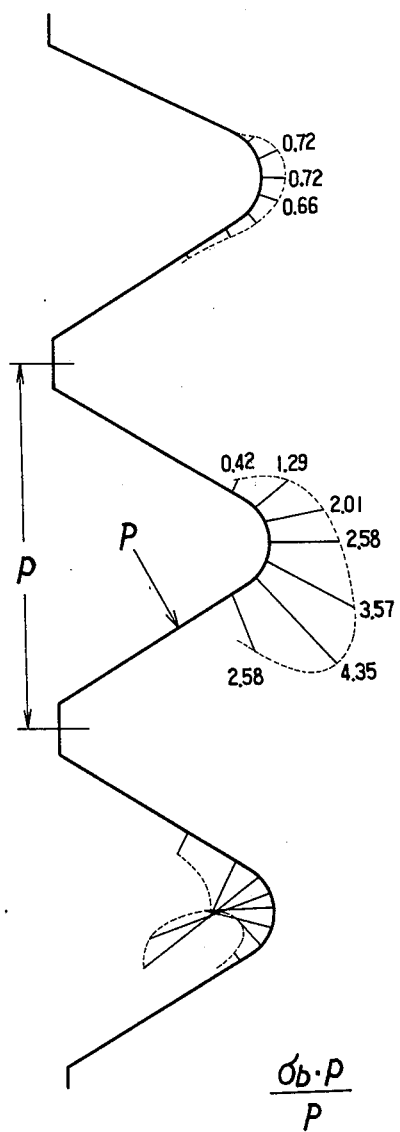
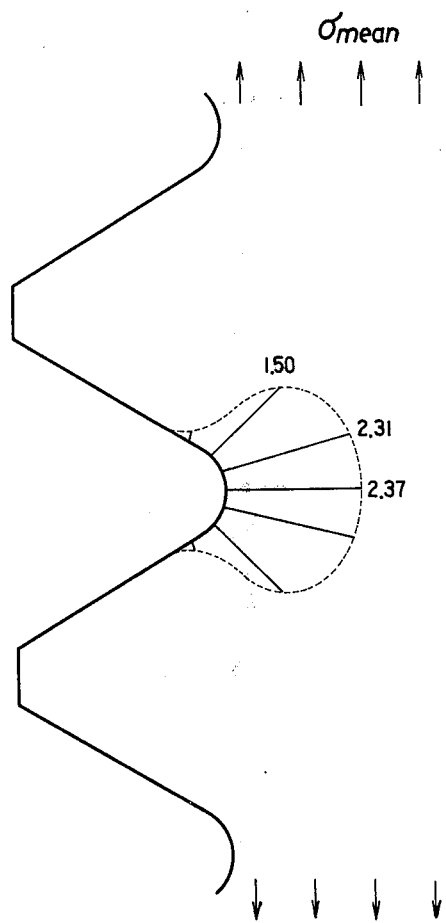

FIG.4a
FIG.4b
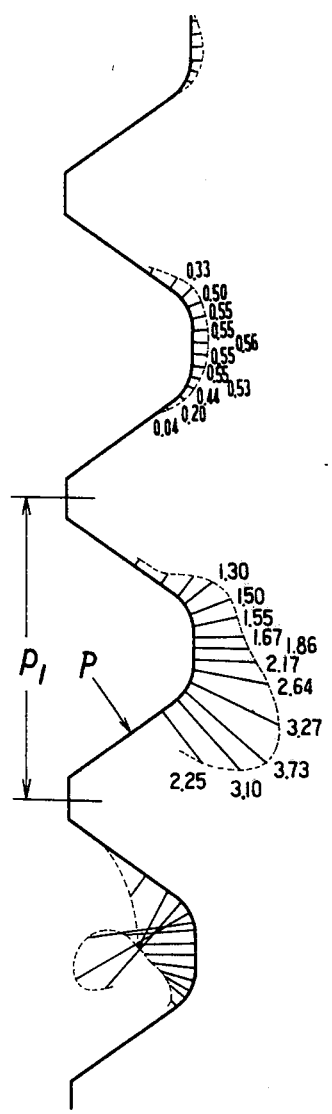
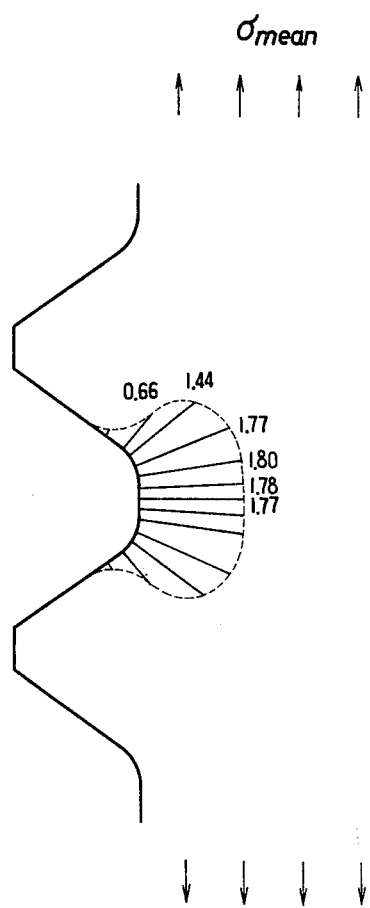

HIGH FATIGUE SCREW THREADS

BACKGROUND OF THE INVENTION

This invention relates to improvements in a high fatigue screw thread system.

When an external force is exerted on a bolt and a nut which are in threaded engagement with each other, the load born by the bolt is distributed to the respective contacting threads of the bolt, causing at each root a stress $\sigma_b$ in a degree corresponding to the load applied to each thread as well as a stress $\sigma_t$ corresponding to the axial clamping force of the bolt. In order to reduce these stresses to enhance the fatigue strength, it is necessary to disperse load distribution in the contacting portions while suppressing concentration of stress in the respective thread roots as little as possible.

SUMMARY OF THE INVENTION

It is an object of the present invention to provide a screw thread system of high fatigue strength.

It is a more particular object of the invention to provide a high fatigue screw system which can suitably be embodied in the form of bolts and nuts of diversified kinds.

As a result of theoretical analysis and experiments, the present inventor has found that symmetric screw threads of the following profiles have distinctively improved load distribution and higher fatigue strength as compared with the existing screw threads.

1. A thread profile having a flank angle of $(70 \pm 2)°$ and a root located at the level of $(0.27 \pm 0.02)$H from the intersecting point of two lines extended from opposing flanks of two adjacent threads and connected to the opposing flanks through arcs having a radius of $(0.15 \pm 0.02)$p where $H$ is the depth and $p$ is the pitch of the thread; and 2. A thread profile having a flank angle of $(160 \pm 5)°$ and a root of a radius of $(0.30 \pm 0.01)$p.

The screw threads are substantially symmetric, i.e. the flanks on opposite sides of the pitch line have the same half angles in section, as can be seen in the Drawings. With the screw threads of the foregoing profile, the absolute value of the load imposed on the individual threads is reduced and at the same time the concentration of stress due to the thread bending action of the imposed load is reduced to a considerable degree, producing synergistic effects to distinctly improve the fatigue strength of the threads.

BRIEF DESCRIPTION OF THE DRAWINGS

In the accompanying drawings:

FIGS. 3a and 3b are diagrammatic views showing stress distribution in presently used ISO meter screw threads;

FIGS. 4a and 4b are diagrammatic views showing stress distributions in the external threads of FIG. 1a;

FIGS. 5a and 5b are diagrammatic views showing stress distributions in the external threads of FIG. 2a.

DESCRIPTION OF PREFERRED EMBODIMENTS

Figure 1A:
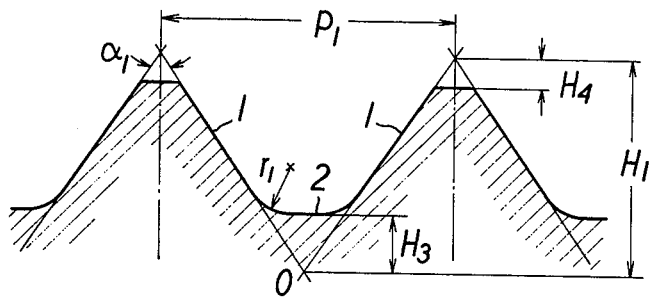
FIGS. 1a and 1b are diagrammatic views showing respectively the external and internal threads of a screw thread system embodying the present invention.

Referring to the accompanying drawings and first to FIG. 1a, the screw threads according to the invention have flanks 1 of an angle $\phi_1 = (70 \pm 2)°$ and a flat root 2 which is located at the level of $H_3 = (0.27 \pm 0.02)H_1$ from an intersecting point o of two lines extended from opposing flanks 1 of two adjacent threads. The flat root 2 is connected to the adjoining flanks through an arc of a radius $r_1 = (0.15 \pm 0.02)$p. In this particular embodiment, the amount of truncation $H_4$ is $H_1/8$ which is the most usual value. The threads may be formed either by rolling or by cutting.

The high fatigue strength of the threads of FIG. 1a remains unchanged as long as the values of the flank angle $a_1$, distance $H_3$ and radius $r_1$ are within the respective tolerance ranges mentioned above and therefore these tolerance ranges may be suitably employed in the actual machining operations.

Figure 1B:
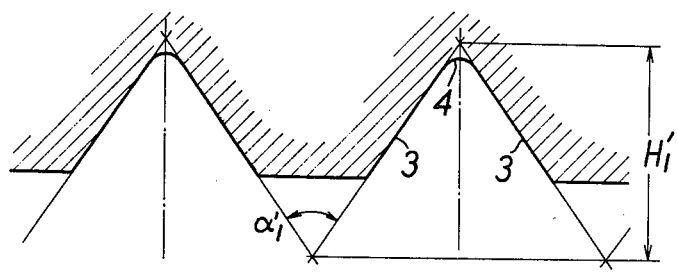

FIG. 1b shows internal threads to be used in combination with the external threads of FIG. 1a, wherein each thread has flanks 3 of a similar angle $a_1' = (70 \pm 2)°$ and a root 4 of a suitable radius to connect two adjacent threads. In this respect, there will arise no special problems in connection with the fatigue strength.

Figure 2A:
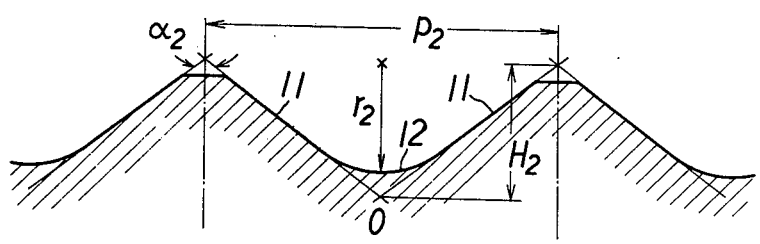
FIGS. 2a and 2b are views similar to FIGS. 1a and 1b but showing external and internal threads in another embodiment of the invention.
Figure 2B:
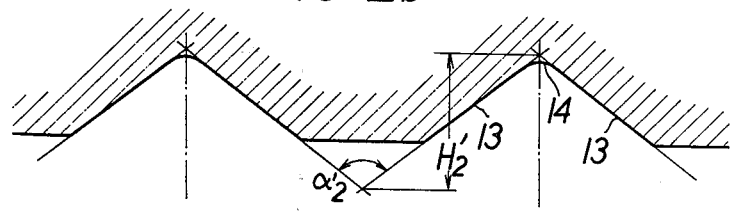

FIG. 2a shows another embodiment of the high fatigue threads according to the invention while FIG. 2b illustrates internal threads to be used in combination with the external threads of FIG. 2a. In FIG. 2a, each thread has flanks 11 at an angle of $a_2 = (106 \pm 5)°$ and the opposing flanks of two adjacent threads are connected by a round root 12 having a radius of $r_2 = (0.30 \pm 0.01)$p$_2$ The internal threads of FIG. 2b are also configured to have a flank angle of $a_2' = (106 \pm 5°$ and connected to each other by an acute root 14 of a suitable radius.

FIGS. 4 and 5 show the distribution of stresses which are produced in the screw threads of the invention shown in FIGS. 1a and 2a, while FIG. 3 shows the distribution of stresses $\sigma_b$ and $\sigma_t$ in the presently used ISO meter screw threads. The distribution of stresses in these figures was measured according to the method described in the inventor's report printed in the Journal of Japan Mechanical Association, No. 303, p. 2197–2203, based on theoretical calculations analyzing two-dimensionally the stress distribution at the thread root by means of complex stress functions.

Figure 5A:
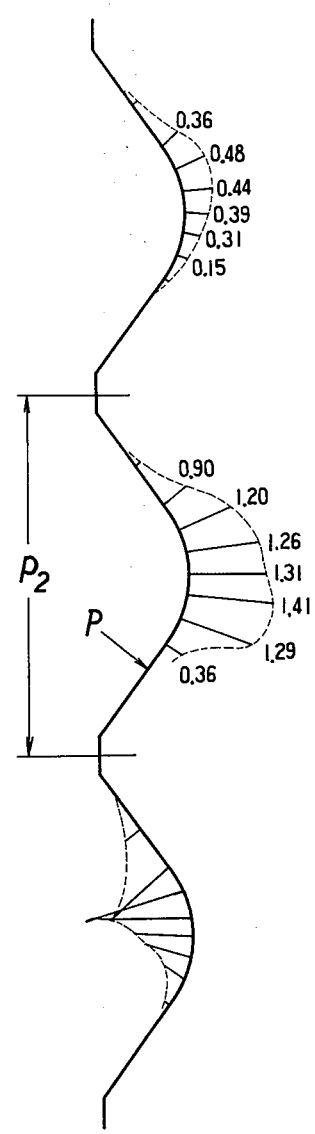

Referring to FIGS. 3a, 4a and 5a, the maximum value of the stress $\sigma_b$p/p which is produced at the thread root is as small as 3.37 in the embodiment of FIG. 4a and 1.41 in the embodiment of FIG. 5a, in contrast to 4.35 in the ordinary ISO meter screw threads of FIG. 3a. This means that the screw threads according to the invention are extremely advantageous from the standpoint of fatigue strength.

The actual stress caused at the roots by application of a concentrated load on the threads can be obtained by adding the stresses which are produced at the roots of the respective threads as in FIGS. 4a and 5a in accordance with the concentrated loads received. Such addition barely imposes influences on the values given in FIGS. 4a and 5a. The contrasting reduction in the values of the stresses at the thread roots can thus be known simply by comparing the values of FIGS. 4a and 5a with those of FIG. 3a.

Figure 5B:
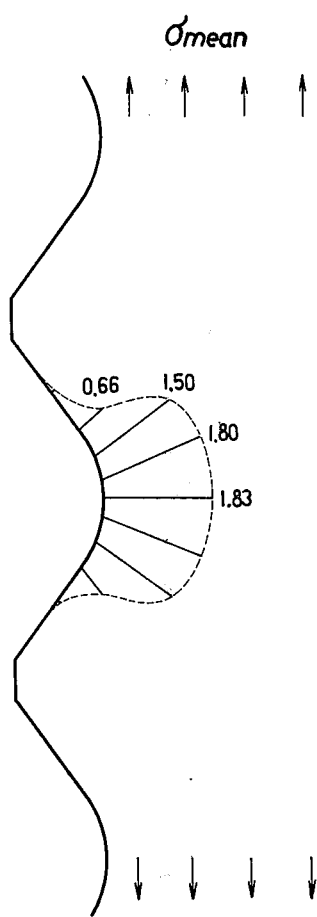

Furthermore, the stress $\sigma_t/\sigma_{mean}$ which is produced by pulling the screw threads with a tensile stress $\sigma_{mean}$ uniformly from an infinite distance has the maximum value of 2.37 in the ordinary ISO meter screw threads shown in FIG. 3b in contrast to 1.80 and 1.83 in the screw threads of the invention shown in FIGS. 4b and 5b. This is also extremely advantageous to ensure high fatigue strength.

In view of the fact that the stresses $\sigma_b$ and $\sigma_t$ are produced in overlapped conditions, it will be understood that the screw threads of the invention can give the so-called synergistic effects in increasing the fatigue strength of a bolt or the like.

Figure 6:
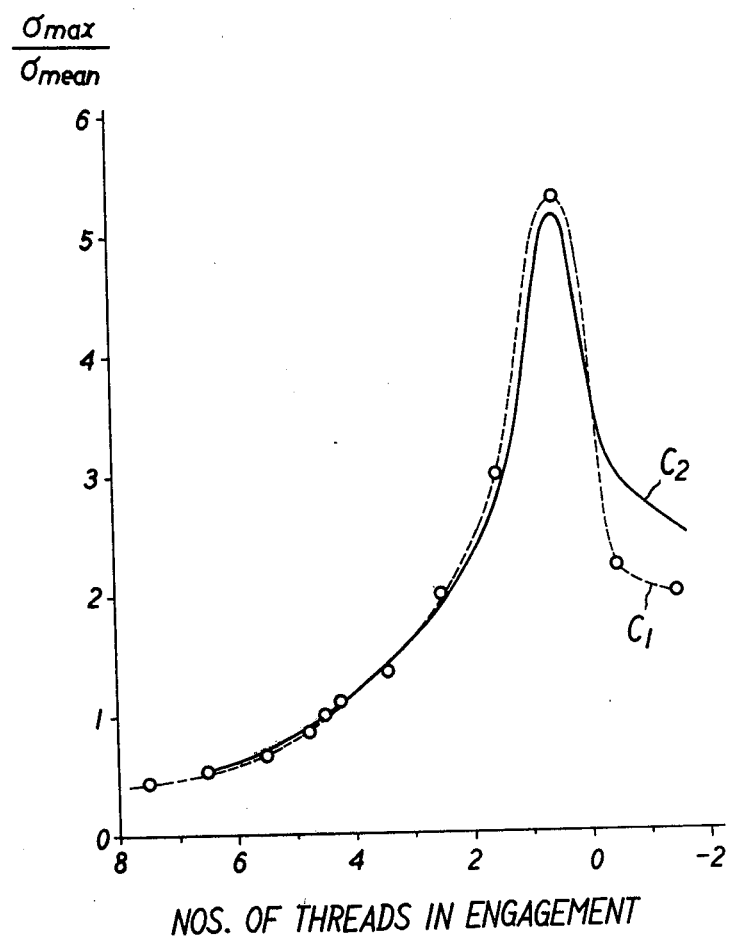
FIG. 6 is a graphic illustration showing variations in the stress distribution in the engaged threads of a bolt and nut.

The values showing stress distribution at the respective thread roots in FIGS. 3 to 5 are obtained by the method as described in the inventor's report mentioned hereinbefore. These values are considered to reflect accurately the actual conditions of the stress distribution as will be understood from the graph of FIG. 6 which shows a plot of profile coefficient ($\sigma$ max/$\sigma$ mean) obtained by the measuring method of the present inventor (Curve 2), in relation to a plot obtained by the Nishida's two-dimensional photo-elasticity method (Curve 1) which is well known and widely used in the art as a valuable method. It will be seen that the two curves closely overlap each other. In FIG. 6, the numbers 1 – 8 on the abscissa denote the threads of the bolt which are engagement with the nut.

What is claimed is

1. A substantially symmetric screw thread system including external threads each profiled to have a flank angle of $(70 \pm 2)°$ and a flat root located at $(0.27 \pm 0.02)H$, from an intersecting point of two lines extended from opposing flanks of two adjacent threads and connected to said opposing flanks through arcs of a radius $(0.15 \pm 0.02)p$ where H is the depth and $p$ is the pitch of the threads.

* * * * *